DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 1, 1970

881 O.G. 22

T881,008

PROCESS FOR INCREASING THE RETENTION OF PAPER FINES AND ADDITIVES BY USING A LINEAR, WATER-DISSIPATABLE, MELTABLE POLYESTER PREPARED FROM MIXED CARBOXYLIC ACIDS AND A GLYCOL

Charles H. Coney, 2008 Canterbury Road 37660, and Donald A. Maxwell, Rte. 11 37663, both of Kingsport, Tenn.

Filed May 13, 1970, Ser. No. 36,995
Int. Cl. D21h *3/60*
U.S. Cl. 162—168
No Drawing. 27 Pages Specification

A linear, water-dissipatable, meltable polyester having an inherent viscosity within the range of about 0.1 to about 0.8 prepared from mixed carboxylic acids (especially sodiosulfoisophthalic acid) and a glycol (especially diethylene glycol) is added as a retention aid to a water slurry or suspension of paper-forming fibers prior to the use of the slurry in a paper-making operation. Such a polymer functions through a flocculating action to cause "paper fines" (for example, small particles of paper-forming fibers and minute particles of additives such as pigments, resinous sizes, binders and the like) to form larger particulate aggregates of such size that they are enmeshed in, and entrapped by, the paper-forming fibers at the screening or sheet-forming step in which water is removed from the slurry. This expedient makes possible retention of the paper fines in the ultimate product and by removing them from the "white water," reduces the amount of treatment necessary to render the water suitable for reuse in making up new slurries of raw stock.